United States Patent [19]

McElyea

[11] 4,452,386
[45] Jun. 5, 1984

[54] HOSE GUIDING ASSEMBLY

[76] Inventor: Ralph W. McElyea, 741 Castle Hill Rd., Redwood City, Calif. 94061

[21] Appl. No.: 426,947

[22] Filed: Sep. 29, 1982

[51] Int. Cl.³ .................. B65H 57/14; B65H 57/26
[52] U.S. Cl. ................................................. 226/197
[58] Field of Search .............. 242/157 R; 226/196, 226/197, 198, 199; 254/389, 390, 394

[56] References Cited

U.S. PATENT DOCUMENTS

| | | | |
|---|---|---|---|
| 1,831,306 | 11/1931 | Kakimoto | 226/197 |
| 1,968,357 | 7/1934 | Schmiett | 226/197 |
| 2,264,751 | 12/1941 | Maxtone-Graham | 226/197 |
| 2,501,407 | 3/1950 | Olsen et al. | 226/197 |
| 2,618,465 | 11/1952 | Austin, Jr. | 226/197 |
| 2,622,925 | 12/1952 | Templeton | 254/394 |
| 2,657,012 | 10/1953 | Whitlock | 226/197 |
| 2,846,189 | 8/1958 | MacLaughlin | 226/197 |
| 2,974,933 | 3/1961 | Belanger | 226/197 |
| 3,081,978 | 3/1963 | Kaufmann | 226/197 |
| 3,249,337 | 5/1966 | Neumann | 226/197 |
| 3,829,065 | 8/1974 | Less | 226/197 |

Primary Examiner—Stanley N. Gilreath
Attorney, Agent, or Firm—Flehr, Hohbach, Test, Albritton & Herbert

[57] ABSTRACT

A hose guiding assembly in which a portable mounting stake can be forced into the ground at selected locations carries a roller for guiding a hose around the stake and stationary guide elements flanking the roller at the ends thereof serve to guide the hose onto the roller while positioning the roller along the stake.

1 Claim, 3 Drawing Figures

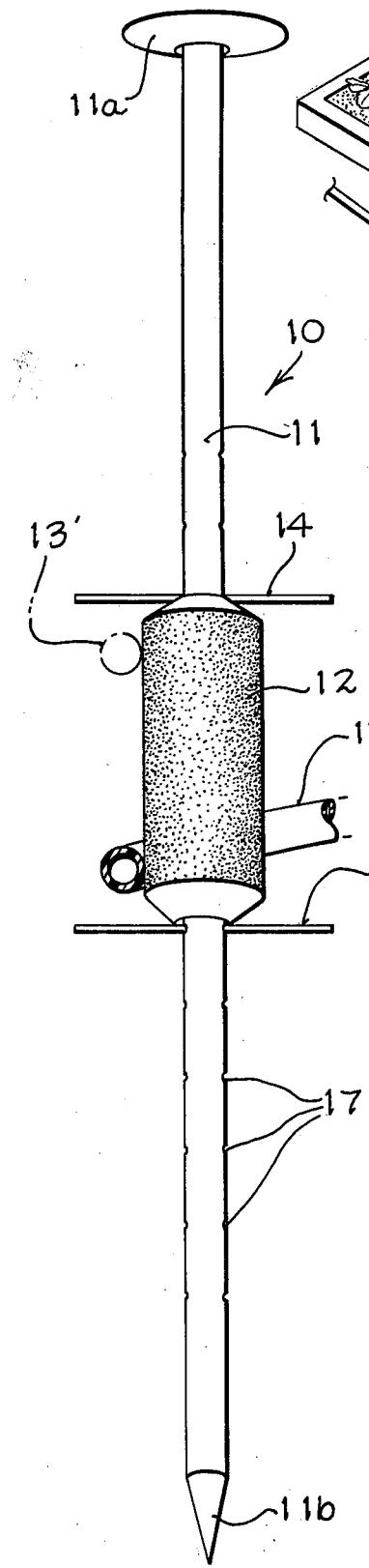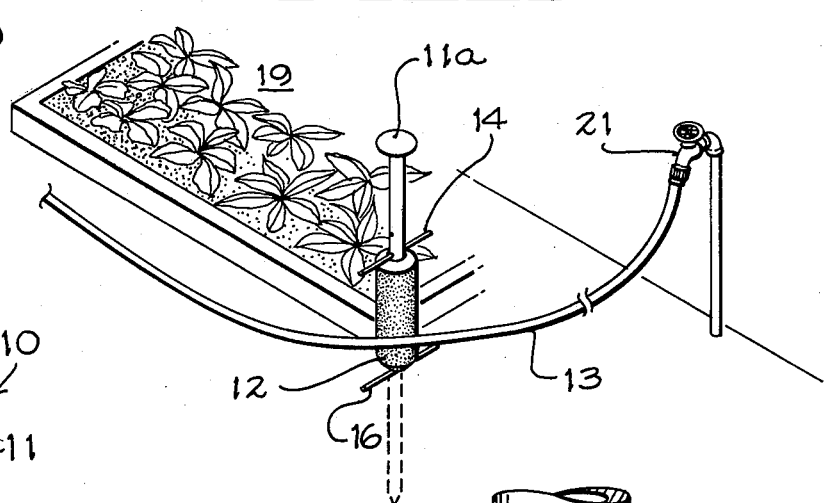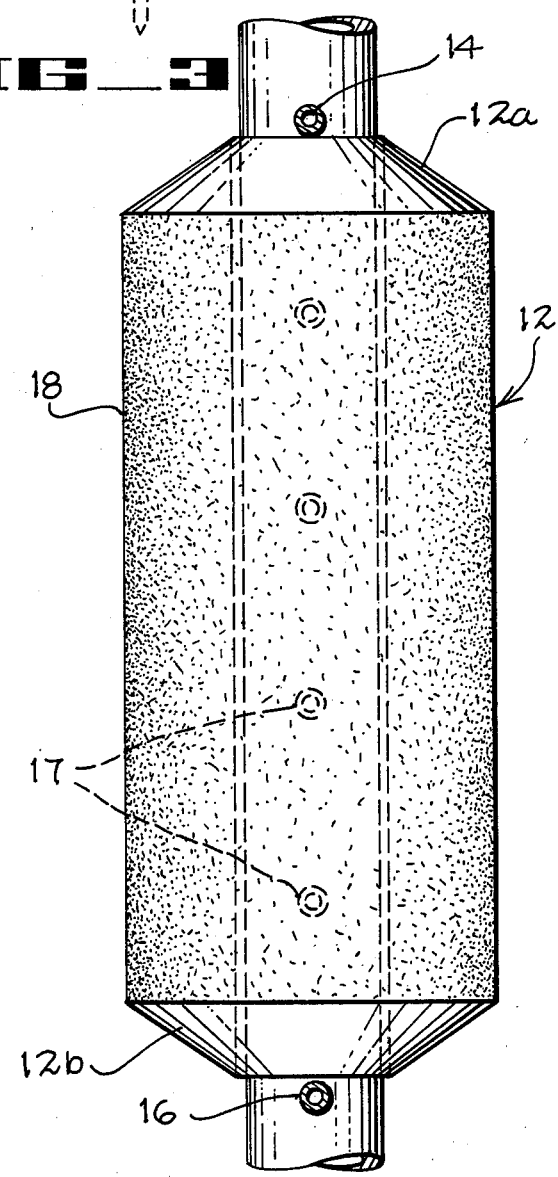

HOSE GUIDING ASSEMBLY

This invention pertains to a hose guiding assembly which is particularly useful in preventing a garden hose from being dragged across easily damaged flower beds or becoming caught on obstructions when handling the hose.

In addition, the hose guiding assembly as disclosed herein can be readily located about a person's yard as desired.

Heretofore, when using a garden hose about a person's yard the hose has tended to catch on various obstructions such as the corners of steps, flower boxes and the like, making the handling of the hose something of an annoyance. In addition, the hose can damage relatively delicate flower beds if dragged across the flowers. Accordingly, there has existed a need for a selectively locatable hose guiding assembly of the kind described herein so as to make the handling of a hose easier as well as to protect particular areas of the yard such as flower beds and the like.

In addition, it is desirable that such a hose guiding assembly be selectively locatable and removable so that it is not necessary to leave the assemblies in the ground where they might serve as a hazard to children and others crossing the yard.

In general, there has been provided a hose guiding assembly comprising a mounting stake adapted to be driven into the ground. One end of the stake includes a portion for receiving the driving forces applied to the stake while the other end of the stake is tapered to more readily penetrate the ground. The stake carries an elongate annular roller adapted to engage and readily turn in response to advancing or moving a hose riding against the surface of the roller. In addition, means are provided for supporting the roller at a selected one of a plurality of positions along the stake.

In general it is an object of the present invention to provide an improved hose guiding assembly.

It is another object of the present invention to provide an improved hose guiding assembly in which the means supporting the roller also serves to guide the hose as it passes around the roller.

The foregoing and other objects of the invention will become more readily evident from the following detailed description when considered in conjunction with the drawings.

FIG. 1 shows a diagrammatic perspective view of a hose guiding assembly, according to the invention;

FIG. 2 shows a diagrammatic perspective view of a hose guiding assembly according to the invention with a hose passing therearound and in section; and FIG. 3 shows an enlarged detail elevation view of a roller mounted upon a stake according to the invention and characterized by a high friction surface.

A hose assembly 10 includes an elongate rigid mounting stake 11 preferably of steel and adapted to be driven into the ground or earth at a selected location.

The upper end of stake 11 includes a broadened portion 11a for receiving driving forces applied to the stake while the other end 11b is tapered or pointed to more readily penetrate the earth or ground.

Stake 11 carries an elongate annular roller 12 adapted to engage and readily turn in response to advancing a hose 13 riding against the peripheral surface of roller 12. Roller 12 preferably is a short length of gas pipe which, as is known, has a roughened exterior surface 18.

Means for supporting roller 12 at a selected one of a plurality of positions along stake 11 includes the pair of pins 14, 16 disposed through associated openings 17 extending diametrically through stake 11. Pins 14, 16 as thus arranged serve as stationary guide elements disposed immediately above and below roller 12 so as to capture hose 13 passing therebetween. This causes hose 13 to ride against the surface of roller 12 when passing around stake 11.

As shown in more particular detail in FIG. 3 the upper and lower ends of roller 12 include beveled surfaces 12a, 12b so as to reduce the drag on rotation of roller 12, and to maintain the axial location of roller 12 along stake 11.

In order to make a significantly improved contact between the hose and roller 12, the exterior of roller 12 has been characterized by a substantial friction surface 18 which can be provided by suitable known means. One particular material which can be applied to the surface of roller 12 is a suitable elastomeric substance whereby the surface area remains somewhat soft and characterized by a substantial amount of "sticktion". However, the simplest and preferred surface treatment can be derived by using a short length of gas pipe for roller 12, as noted above.

For disposing the roller at an appropriate height, as desired, the series of openings 17 are distributed in pairs along stake 11. The pairs of openings 17 are not necessarily adjacent to each other as shown, for example by the location of pins 14, 16 in FIG. 3 where six openings may be located between the two pins. However, each pair of openings lies at different associated displacements from the top of the stake for receiving elongate guide elements, such as pins 14, 16 above and below roller 12 whereby the pins will lie in closely associated relationship to the ends of roller 12.

Further, by disposing stationary guide elements 14, 16 closely adjacent the ends of roller 12, elements 14, 16 define the maximum travel of hose 13 along roller 12 between the limits defined by the solid line position of hose 13 and position 13'.

In operation, as shown in FIG. 1, hose guide assembly 10 is driven or forced into the ground adjacent a corner of a planter box 19 or other obstruction. Hose 13 connected to a faucet 21 leads around roller 12 between pins 14, 16 which serve to restrict the vertical travel of hose 13 along the surface of roller 12. In this way pins 14, 16 serve as guide means while supporting the roller at a selected one of a plurality of positions along stake 11.

From the foregoing it will be readily evident that there has been provided an improved and simplified hose guiding assembly useful in protecting delicate plants as well as for preventing catching the hose on the corners of planter boxes, steps and other similar obstructions associated with a person's yard.

I claim:

1. A hose guiding assembly comprising a mounting stake adapted to be driven into the ground, one end of said stake including a portion for receiving driving forces applied to the stake, the other end of said stake being tapered to more readily penetrate the ground, an elongate annular roller carried on said stake adapted to engage and readily turn in response to advancing a hose riding against the surface of said roller, and means for supporting said roller at a selected one of a plurality of positions along said stake, the axis of said roller being coincident with the axis of said stake, the last named means including a series of openings distributed in pairs along said stake, elongate pins disposed in a given pair of said openings, the openings of said given pair being disposed respectively adjacent each end of said roller, each of said pins extending radially to opposite sides of said stake sufficiently to confine the position of said roller between said pair of pins and to prevent the hose from moving to a position axially beyond the ends of said roller.

* * * * *